United States Patent
Dayal et al.

(10) Patent No.: US 9,330,798 B2
(45) Date of Patent: May 3, 2016

(54) SYSTEMS AND METHODS FOR PROCESSING IRRADIATION TARGETS THROUGH A NUCLEAR REACTOR

(75) Inventors: Yogeshwar Dayal, San Jose, CA (US); Earl F. Saito, Wilmington, NC (US); John F. Berger, Wilmington, NC (US); Martin W. Brittingham, Wilmington, NC (US); Stephen K. Morales, Wilmington, NC (US); Jeffrey M. Hare, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 890 days.

(21) Appl. No.: 13/339,345

(22) Filed: Dec. 28, 2011

(65) Prior Publication Data

US 2013/0170927 A1 Jul. 4, 2013

(51) Int. Cl.
*G21C 23/00* (2006.01)
*G21G 1/02* (2006.01)

(52) U.S. Cl.
CPC . *G21C 23/00* (2013.01); *G21G 1/02* (2013.01)

(58) Field of Classification Search
CPC ...................................................... G21G 1/02
USPC ................................. 376/342, 264, 340, 341
See application file for complete search history.

(56) References Cited

U.S. PATENT DOCUMENTS

| | | | |
|---|---|---|---|
| 3,069,337 A * | 12/1962 | Cabell | 376/342 |
| 3,263,081 A * | 7/1966 | Wiesemann et al. | 376/254 |
| 3,940,318 A | 2/1976 | Arino | |
| 4,196,047 A | 4/1980 | Mitchem | |
| 4,393,510 A | 7/1983 | Lang | |
| 4,643,846 A * | 2/1987 | Kanai et al. | 588/3 |
| 4,663,111 A | 5/1987 | Kim | |
| 4,920,994 A * | 5/1990 | Nachbar | 134/1 |
| 5,910,971 A | 6/1999 | Ponomarev-Stepnoy | |
| 6,678,344 B2 | 1/2004 | O'Leary | |
| 8,488,733 B2 | 7/2013 | Allen et al. | |
| 2004/0105520 A1 | 6/2004 | Carter | |

(Continued)

FOREIGN PATENT DOCUMENTS

| | | |
|---|---|---|
| JP | 37-016696 | 7/1962 |
| JP | 43-010479 | 5/1968 |

(Continued)

OTHER PUBLICATIONS

Office Action in corresponding Japanese Application 2012-232461, Oct. 21, 2014.

*Primary Examiner* — Jack W Keith
*Assistant Examiner* — Sharon M Davis
(74) *Attorney, Agent, or Firm* — Ryan Alley Intellectual Property Law

(57) ABSTRACT

Apparatuses and methods produce radioisotopes in instrumentation tubes of operating commercial nuclear reactors. Irradiation targets may be inserted and removed from instrumentation tubes during operation and converted to radioisotopes otherwise unavailable during operation of commercial nuclear reactors. Example apparatuses may continuously insert, remove, and store irradiation targets to be converted to useable radioisotopes or other desired materials at several different origin and termination points accessible outside an access barrier such as a containment building, drywell wall, or other access restriction preventing access to instrumentation tubes during operation of the nuclear plant.

18 Claims, 8 Drawing Sheets

(56) References Cited

U.S. PATENT DOCUMENTS

| | | |
|---|---|---|
| 2009/0135983 A1 | 5/2009 | Russell, II |
| 2009/0213977 A1 | 8/2009 | Russell, II |
| 2011/0051872 A1 | 3/2011 | Rickard |
| 2011/0051874 A1 | 3/2011 | Allen |
| 2011/0051875 A1 | 3/2011 | Bloomquist |
| 2011/0216868 A1 | 9/2011 | Russell, II |
| 2012/0001012 A1 | 1/2012 | Yasuta |

FOREIGN PATENT DOCUMENTS

| | | |
|---|---|---|
| JP | 2009-198500 | 9/2009 |
| JP | 2011-047937 | 3/2011 |

\* cited by examiner

250A

250B

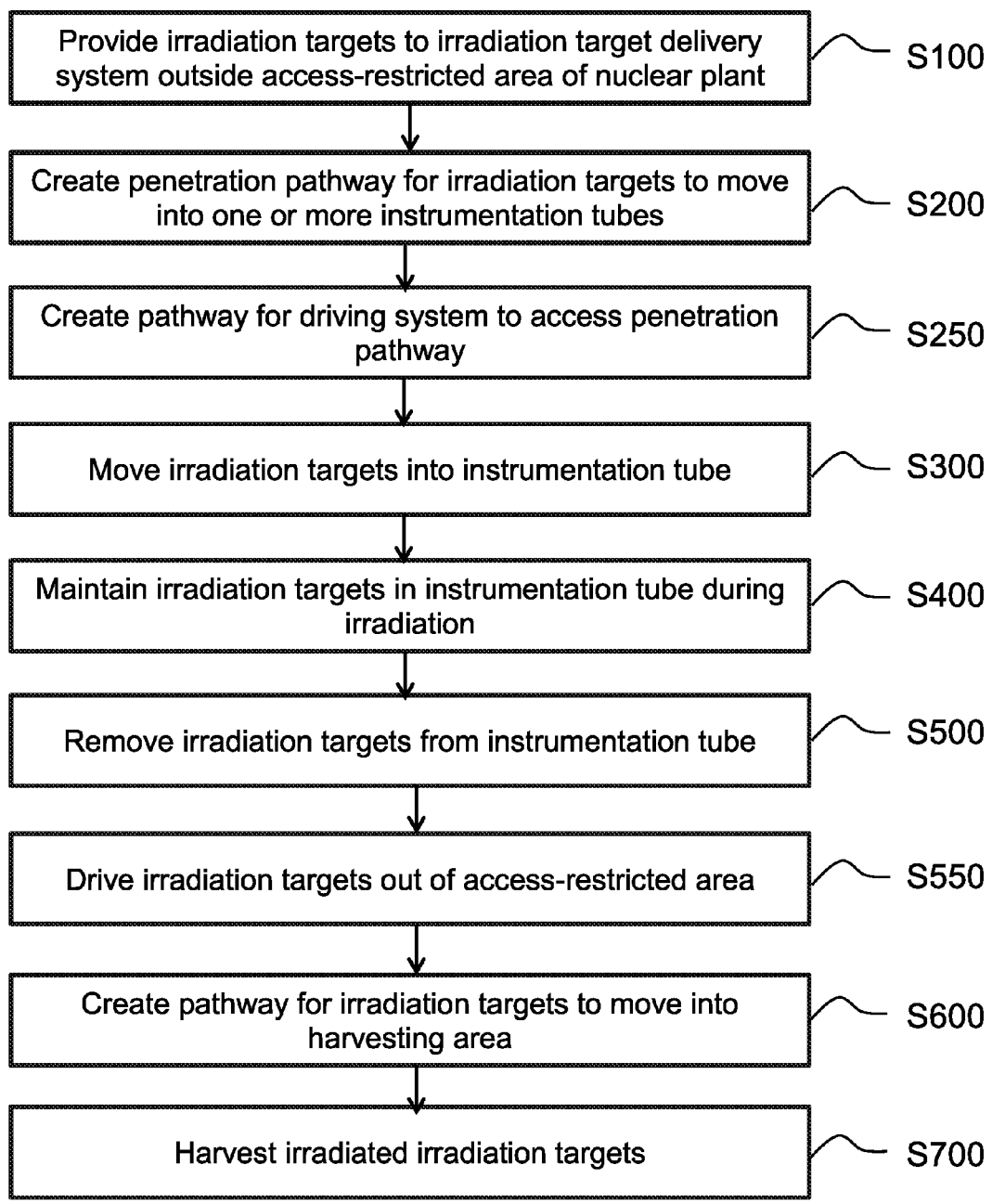

US 9,330,798 B2

SYSTEMS AND METHODS FOR PROCESSING IRRADIATION TARGETS THROUGH A NUCLEAR REACTOR

GOVERNMENT SUPPORT

This invention was made with Government support under contract number DE-FC52-09NA29626, awarded by the U.S. Department of Energy. The Government has certain rights in the invention.

BACKGROUND

Elements, and specific isotopes thereof, may be formed by bombarding parent materials with appropriate radiation to cause a conversion to desired daughter isotopes. For example, precious metals and/or radioisotopes may be formed through such bombardment. Conventionally, particle accelerators or specially-designed, non-commercial test reactors are used to achieve such bombardment and produce desired isotopes in relatively small amounts.

Radioisotopes have a variety of medical and industrial applications stemming from their ability to emit discreet amounts and types of ionizing radiation and form useful daughter products. For example, radioisotopes are useful in cancer-related therapy, medical imaging and labeling technology, cancer and other disease diagnosis, and medical sterilization.

Radioisotopes having half-lives on the order of days or hours are conventionally produced by bombarding stable parent isotopes in accelerators or low-power, non-electricity-generating reactors. These accelerators or reactors are on-site at medical or industrial facilities or at nearby production facilities. Especially short-lived radioisotopes must be quickly transported due to the relatively quick decay time and the exact amounts of radioisotopes needed in particular applications. Further, on-site production of radioisotopes generally requires cumbersome and expensive irradiation and extraction equipment, which may be cost-, space-, and/or safety-prohibitive at end-use facilities.

SUMMARY

Example embodiments include systems for delivering and retrieving irradiation targets in otherwise inaccessible nuclear reactors to generate desired isotopes from the irradiation targets. Example systems include a penetration pathway from an origin to an instrumentation tube in the reactor to permit irradiation targets to move between the two, and a loading/offloading system that can select between loading and offloading paths to guide fresh and irradiated targets to/from different destinations and locations based on their status. The origin and harvesting destination may be outside of an access-restricted area to permit access for refilling or harvesting during plant operation. As an example, penetration pathways and loading/offloading systems may include tubing that provides an enclosed and thus air-tight route for irradiation targets to traverse, with filtered exhaust points that prevent migration of radioactive progeny out of example systems.

Example systems may be gravity-driven and/or may further be useable with, or include, a drive system that can actively move irradiation targets between destinations. Loading/offloading systems may accommodate drive systems by being attachable thereto and providing additional paths for drive systems to enter into penetration pathways. For example, a drive system may include a plunger and a cable shaped to pass through the penetration pathway and mechanically push against a discreet irradiation target, a pneumatic system, a conveyor, a magnetic system, etc. and may take advantage of existing Traversing Incore Probe (TIP) drives. Loading/offloading systems may provide several different paths to distinct destinations through the use of a loading junction, T-junction, turntable, Y-junction, selector, etc. Flow restrictors and sensors throughout example systems may enable automatic path switching and driving to move irradiation targets through example systems from source to irradiation tube to harvesting area. Similarly, irradiation targets may be provided manually or automatically from a reservoir based on need and plant operation. Harvesting areas may include a DoT and/or USNRC-compliant shipping cask for containing and storing irradiated irradiation targets containing desired daughter products for end-user consumption.

Irradiation targets may be shaped, sized, and otherwise configured to be compatible with movement through example systems. For example, irradiation targets may be formed of spheres of a solid material that will convert to a useable amount of daughter product when exposed to neutron radiation in an instrumentation tube for a number of hours or days. Molybdenum-98, natural iridium, or liquid or gaseous materials, for example, may be used as irradiation targets given proper containment. Irradiation targets are further configured to fit within instrumentation tubes and may be held in the same in example systems by drive systems and/or static latches, valves, gravity, pneumatic pressure, etc.

Example methods include creating a penetration pathway to an instrumentation tube for traverse by an irradiation target, moving the irradiation target into the instrumentation tube through the penetration pathway, irradiating the irradiation target in the instrumentation tube, switching to an exit pathway between the instrumentation tube and a harvesting area outside of an access barrier, and moving the irradiated irradiation targets to the harvesting area through the exit pathway for harvesting.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

FIG. 8 is a flow chart illustrating example methods of irradiating irradiation targets in nuclear reactor instrumentation tubes.

DETAILED DESCRIPTION

Figure 1:
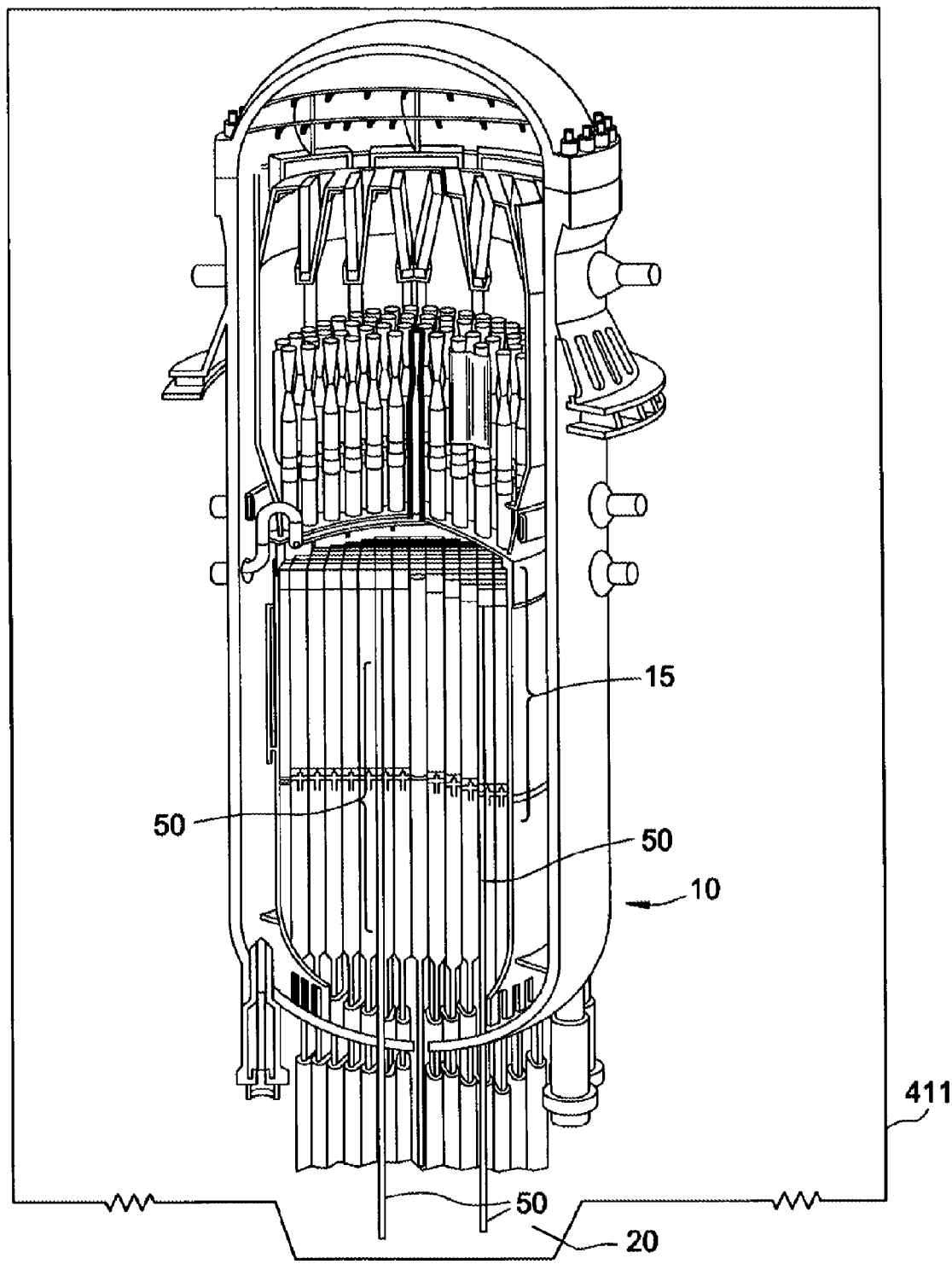
FIG. 1 is an illustration of a conventional commercial nuclear reactor.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

FIG. 1 is an illustration of a conventional nuclear reactor pressure vessel 10 usable with example embodiments and example methods. Reactor pressure vessel 10 may be, for example, a 100+ MWe commercial light water nuclear reactor conventionally used for electricity generation throughout the world. Reactor pressure vessel 10 is conventionally contained within an access barrier 411 that serves to contain radioactivity in the case of an accident and prevent access to reactor 10 during operation of the reactor 10. As defined herein, an access barrier is any structure that prevents human access to an area during operation of the nuclear reactor due to safety or operational hazards such as radiation. As such, access barrier 411 may be a containment building sealed and inaccessible during reactor operation, a drywell wall surrounding an area around the reactor, a reactor shield wall, a human movement barrier preventing access to instrumentation tube 50, etc.

A cavity below the reactor vessel 10, known as a drywell 20, serves to house equipment servicing the vessel such as pumps, drains, instrumentation tubes, and/or control rod drives. As shown in FIG. 1 and as defined herein, at least one instrumentation tube 50 extends into the vessel 10 and near, into, or through core 15 containing nuclear fuel and relatively high levels of neutron flux and other radiation during operation of the core 15. As existing in conventional nuclear power reactors and as defined herein, instrumentation tubes 50 are enclosed within vessel 10 and open outside of vessel 10, permitting spatial access to positions proximate to core 15 from outside vessel 10 while still being physically separated from innards of the reactor and core by instrumentation tube 50. Instrumentation tubes 50 may be generally cylindrical and may widen with height of the vessel 10; however, other instrumentation tube geometries may be encountered in the industry. An instrumentation tube 50 may have an inner diameter of about 1-0.5 inch, for example.

Instrumentation tubes 50 may terminate below the reactor vessel 10 in the drywell 20. Conventionally, instrumentation tubes 50 may permit neutron detectors, and other types of detectors, to be inserted therein through an opening at a lower end in the drywell 20. These detectors may extend up through instrumentation tubes 50 to monitor conditions in the core 15. Examples of conventional monitor types include wide range detectors (WRNM), source range monitors (SRM), intermediate range monitors (IRM), and traversing Incore probes (TIP). Access to the instrumentation tubes 50 and any monitoring devices inserted therein is conventionally restricted to operational outages due to containment and radiation hazards.

Although vessel 10 is illustrated with components commonly found in a commercial Boiling Water Reactor, example embodiments and methods are useable with several different types of reactors having instrumentation tubes 50 or other access tubes that extend into the reactor. For example, Pressurized Water Reactors, Heavy-Water Reactors, Graphite-Moderated Reactors, etc. having a power rating from below 100 Megawatts-electric to several Gigawatts-electric and having instrumentation tubes at several different positions from those shown in FIG. 1 may be useable with example embodiments and methods. As such, instrumentation tubes useable in example methods may be at any geometry about the core that allows enclosed access to the flux of the nuclear core of various types of reactors.

Applicants have recognized that instrumentation tubes 50 may be useable to relatively quickly and constantly generate short-term radioisotopes on a large-scale basis without interfering with an operating or refueling core 15. Applicants have further recognized a need to generate short-term radioisotopes and remove them from within access barrier 411 quickly, without having to shut down an operating nuclear reactor to access an area within access barrier 411. Example methods include inserting irradiation targets into instrumentation tubes 50 and exposing the irradiation targets to the core 15 while operating or producing radiation, thereby exposing the irradiation targets to the neutron flux and other radiation commonly encountered in the operating core 15. The core flux over time converts a substantial portion of the irradiation targets to a useful mass of radioisotope, including short-term radioisotopes useable in medical applications. Irradiation targets may then be withdrawn from the instrumentation tubes 50, even during ongoing operation of the core 15, and removed for medical and/or industrial use.

Example embodiment systems include a penetration pathway and loading/offloading system to provide irradiation targets in the above manner from origin points and to terminal points accessible during plant operation. Drive systems and several other components are useable with example embodiment systems, and specific example embodiments and methods are discussed below, including details of how example methods may enable example embodiments.

Figure 2:
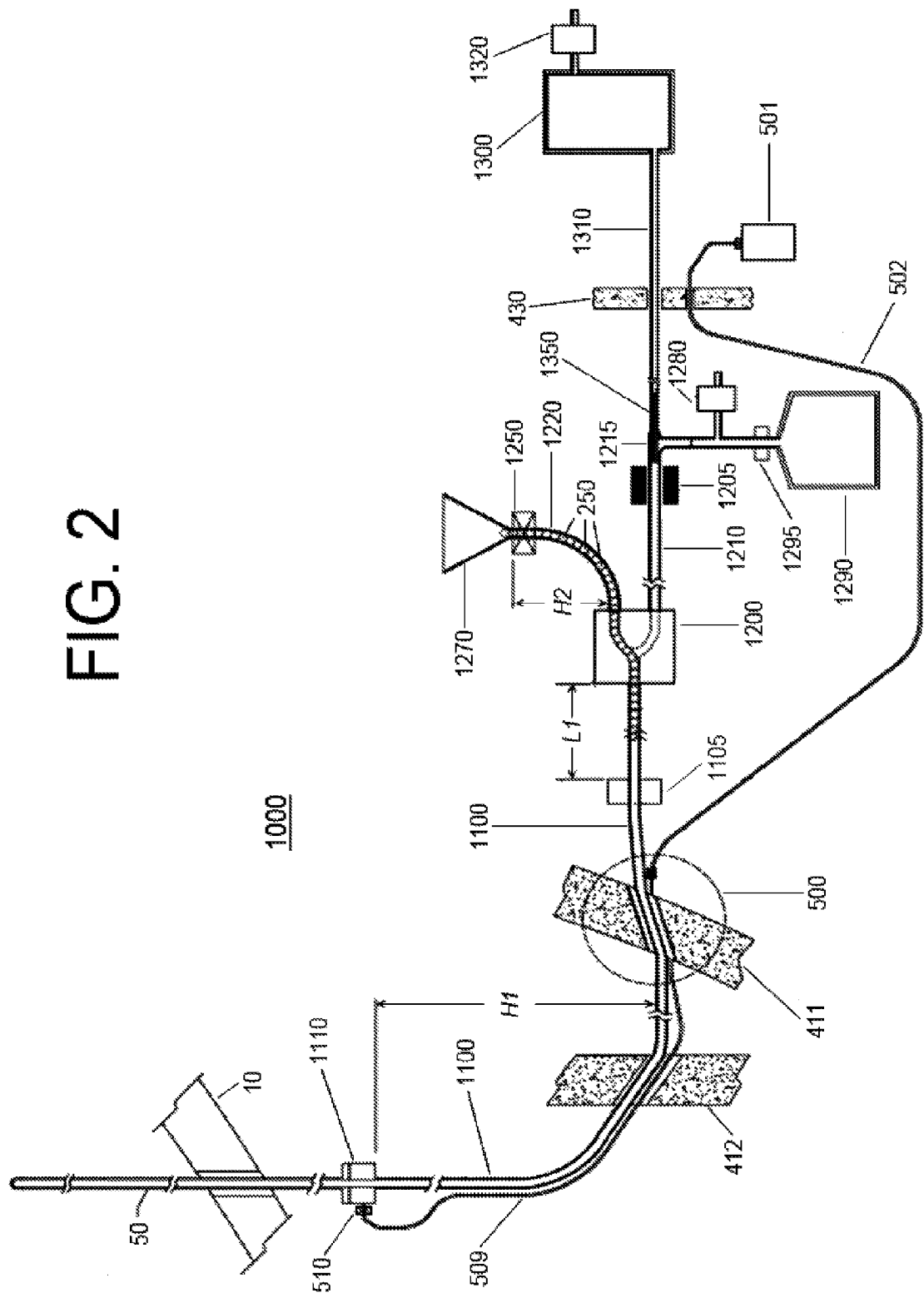
FIG. 2 is an illustration of an example embodiment irradiation target retrieval system in a loading configuration.

FIG. 2 is a schematic drawing of an example embodiment irradiation target delivery and retrieval system 1000 having specific types of a penetration pathway, a loading/offloading system, and a drive system. FIG. 2 illustrates various components of example system 1000 in a loading configuration, with other configurations possible and shown, in part, in other drawings. As shown in FIG. 2, example embodiment irradiation target delivery and retrieval system 1000 may include or use one or more elements to facilitate irradiation target loading, irradiation, and harvesting in a timely, automatic, and/or consumption-enhancing manner. System 1000 includes a penetration pathway that provides a path from outside access barrier 411 to instrumentation tube 50 for one or more irradiation targets, a loading/offloading system that permits new irradiation targets to be inserted and irradiated targets to be harvested outside access barrier 411, and a drive system that moves irradiation targets between instrumentation tube 50 and loading/offloading in example embodiment system 1000.

A penetration pathway in example embodiment system 1000 provides a reliable path of travel for irradiation targets 250 between an accessible location, such as an offloading or loading area outside access barrier 411 into an instrumentation tube 50, so irradiation targets 250 can move within the pathway to a position in or near an operating nuclear core 15 for irradiation. Example pathways can include many delivery mechanisms used alone or in combination, including tubing, frames, wires, chains, conveyors, etc. in example embodiment system 1000 to provide a transit path for an irradiation target between an accessible location and an operating nuclear core. As a specific example shown in FIG. 2, a penetration pathway may include penetration tubing 1100 running between, either in portions or continuously, a loading junction 1200 and instrumentation tube 50 in a nuclear reactor.

Penetration tubing 1100 may be flexible or rigid and sized to appropriately permit irradiation targets 250 to enter into and/or through penetration tubing 1100 and navigate various structures and penetrations in and within access barrier 411. Penetration tubing 1100 may be continuously sealed or include openings, such as at connecting junctions. Penetration tubing 1100 may junction with other tubes and/or structures and/or include interruptions. One possible advantage of penetration tubing 1100 being sealed and securely mating at junctures and/or with any terminal/originating points is that penetration tubing 1100 better maintains pneumatic pressure that can be used for target withdrawal, and also may provide additional containment for irradiation targets 250 and any products (gas, fluid, solid, particulate, etc.) formed as irradiation products in example embodiment system 1000.

Penetration tubing 1100 may be fabricated of a material that maintains its physical characteristics in an operating nuclear reactor environment and does not significantly react with or entrain materials from irradiation targets 250 coming into contact therewith, including, for example, aluminum, stainless steel, carbon steel, nickel alloys, PVC, PFA, rubber, etc. Penetration tubing 1100 may be cylindrical or any other shape that permits irradiation targets 250 to enter into and/or pass through penetration tubing 1100. For example, penetration tubing 1100 may have a generally circular cross section with a 0.5-inch diameter and smooth interior surface that permits spherical irradiation target 250 to roll within penetration tubing 1100. One potential advantage of using such an example penetration tubing 1100 may be roughly matching diameters and geometries with instrumentation tube 50 for consistent irradiation target movement therein; however, alternate geometries, shapes, and sizes for penetration tubing 1100, or any other penetration pathway used in example embodiments, including those that limit movement, may be desirable, advantageous, and used.

Penetration tubing 1100 used in example embodiment system 1000 provides a route from an origin at loading junction 1200, where irradiation targets may enter/exit penetration tubing 1100 outside of access barrier 411. As shown in FIG. 2, for example, penetration tubing 1100 leads irradiation targets 250 from loading junction 1200 to access barrier 411, which may be, for example, a steel-lined reinforced concrete containment wall or drywell wall or any other access restriction in conventional nuclear power stations. A penetration pathway flow limiter 1105, which may be a ball shear valve, a solenoid valve, a simple clamp, a pin and transducer, etc., may be placed on penetration tubing 1100 to control and/or prevent irradiation targets 250 from travelling in penetration tubing 1100 in one or more directions. For example, penetration pathway flow limiter 1105 may engage during a loading operation as shown in FIG. 2 to prevent irradiation targets from moving inside of access barrier 411 in penetration tubing 1100. Flow limiter 1105 may be positioned a distance L1 from any entry point of irradiation targets 250 from loading junction 1200 such that all irradiation targets are loaded into a penetration pathway before travelling therein. For example, L1 may be an equivalent distance in which irradiation targets 250 are intended to travel into instrumentation tube 50. Penetration pathway flow limiter 1105 may further seal any exterior pathway leading through access barrier 411 to reduce or prevent unwanted migration of material outside of access barrier 411 and provide isolation for areas within access barrier 411.

Penetration pathways usable in example embodiment system 1000 provide a route through access barrier 411 and to reactor vessel 10 where irradiation targets 250 may enter an instrumentation tube 50. For example, as shown in FIG. 2, penetration tubing 1100 penetrates access barrier 411 and extends to instrumentation tube 50. Penetration tubing 1100 may pass through an existing penetration in access barrier 411, such as an existing TIP tube penetration, or may use a new penetration created for penetration tubing 1100. Penetration tubing 1100 negotiates or passes through any other objects inside of access barrier 411 before reaching instrumentation tube 50. An annular reactor pedestal 412 may be present in a drywell 20 beneath reactor 10, and penetration tubing 1100 is shown in FIG. 2 passing through a penetration in pedestal 412. It is understood that penetration pathways may follow any number of different courses and negotiate different obstacles in different reactor designs aside from the specific example path shown with penetration tubing 1100 in FIG. 2. Similarly, penetration pathways need not be consistent or uniform; for example, penetration tubing 1100 may terminate on either side of, and be connected to, a penetration in pedestal 412 to permit irradiation targets 250 to pass through the penetration between penetration tubing 1100.

Penetration pathways useable in example embodiment system 1000 may terminate at or within an instrumentation tube. As shown in FIG. 2, penetration tubing 1100 terminates at a flange 1110 at a base of instrumentation tube 50, permitting irradiation targets 250 to pass from penetration tubing 1100 into instrumentation tube 50. Alternatively, penetration tubing 1100 may pass into and/or throughout instrumentation tube 50 to provide a liner or separate tube within instrumentation tube 50; in this way, penetration tubing 1100 may present a continuous inner diameter between a penetration pathway and instrumentation tube 50 and ensure that any variation or undesired geometry in instrumentation tube 50 does not significantly interfere with irradiation target 250 movement therein, while providing an additional level of containment for irradiation targets 250.

As shown in FIG. 2, penetration tubing 1100 may descend a vertical distance H1 between flange 1110 of instrumentation tube 50 and a lowest point adjacent to access barrier 411. Distance H1 may have a length sufficient to ensure that all irradiation targets 250 exit instrumentation tube 50 by gravity and be at a point below flange 1110; that is, H1 may be greater than or equal to a maximum length of corresponding instrumentation tube 50. Configuring penetration tubing 1100 with a vertical height H1 may present an advantage of working with pneumatic driving system 500 and related components 510, 509, 501, and 502 by ensuring all irradiation targets 250 drop by gravity below flange 1110 and penetration valve 510 where a pneumatic driving fluid may be introduced.

Penetration pathways useable in example embodiments may be pre-existing in part and/or installed during access to containment areas and/or restricted access areas in a nuclear power plant, such as during a pre-planned outage. For example, penetration tubing 1100 may be installed in access barrier 411 during an outage, with penetration tubing 1100 being passed through penetrations in access barrier 411 and pedestal 412, moved and secured in an area within access barrier 411 and a drywell space 20 under reactor 10, and secured to flange 1105. Portions of penetration tubing 1100 extending outside access barrier 411 may be installed at loading junction 1200 at any time. Penetration tubing 1100 may be secured at various points inside access barrier 411 and/or divert around existing equipment to minimize congestion or clutter in a drywell 20 or other space bounded by access barrier 411 while preserving a traversable path for irradiation targets 250 to and from instrumentation tube 50. Again, other penetration pathways, including wire guides, meshes, compartments, bored tunnels, etc. are useable in example embodiments to provide a path from outside an access-restricted area such as containment to an instrumentation tube of an operating nuclear reactor.

Example embodiment irradiation target delivery and retrieval system 1000 further includes a loading/offloading system that permits new irradiation targets to be inserted and irradiated targets to be harvested outside access barrier 411. Loading and offloading systems usable with example embodiments permit irradiation targets 250 to be supplied and loaded into a penetration pathway and ultimately an instrumentation tube 50 from points outside of access barrier 411, as well as permitting irradiated irradiation targets 250 to be harvested outside of access barrier 411. As such, loading and offloading systems provide multiple paths between plural destinations in example embodiment systems and permit irradiation targets to be moved toward destinations based on path configuration and target irradiation status. Loading and offloading systems work with penetration pathways in example embodiments and may be connected to penetration pathways to deliver/receive irradiation targets to/from penetrations pathways.

As shown in FIG. 2, an example loading and offloading system may include an irradiation target reservoir 1270 and reservoir flow limiter 1250. Reservoir 1270 may hold a particular or arbitrary number of irradiation targets 250 and be reloaded based on need or schedule with additional irradiation targets 250, regardless of plant operational status. Reservoir flow limiter 1250 may permit irradiation targets 250 to pass into a reservoir connector 1220 at desired times or at desired rates or amounts. For example, reservoir flow limiter 1250 may be a stop valve, gate valve, etc., that permits only a number of irradiation targets 250 that would be required to fill penetration tubing 1100 a length of L1 to enter reservoir connector 1220. Reservoir flow limiter 1250 may be operated directly or remotely or may be automatically programmed to dispense irradiation targets 250 at particular times and in particular fashions.

Although a single irradiation target reservoir 1270, reservoir flow limiter 1250, and reservoir connector 1220 are shown connected to a loading junction 1200 and penetration tubing 1100 in FIG. 2, it is understood that more than one of these structures may be used. Further, these structures may be connected to multiple penetration pathways, such that a single reservoir 1270 may supply irradiation targets 250 into multiple penetration pathways and instrumentation tubes 50. Reservoir flow limiter 1250 may be further configured or programmed to direct irradiation targets 250 into appropriate reservoir connectors 1220 corresponding to individual penetration pathways and instrumentation tubes, if multiple reservoir connectors 1220 are used to ultimately reach multiple instrumentation tubes 50. Such an example may present an additional advantage of providing a single load point for irradiation targets 250 with access to multiple instrumentation tubes 50 for increased isotope generation.

Irradiation target reservoir 1270 may connect to a loading junction 1200 via reservoir connector 1220 or any other pathway to provide irradiation targets 250 into loading junction 1200. Irradiation targets 250 may be moved between irradiation target reservoir 1270 and loading junction 1200 by any known mechanism, including reservoir flow limiter 1250, pneumatic force, magnetic force, gravity, etc. For example, if irradiation target reservoir 1270 connects to reservoir connector 1220 at a vertical height H2 above an entry point to loading junction 1200, gravity may drive irradiation targets 250 into loading junction 1200 if irradiation targets 250 are configured to move by gravity through reservoir connector 1220 or directly into loading junction 1200. If used, reservoir connector 1220 may be fabricated of a material and of a configuration that does not significantly react with or entrain materials from irradiation targets 250 coming into contact therewith, including, for example, aluminum, stainless steel, nickel alloys, PVC, PFA, carbon steel, rubber, etc. Reservoir connector 1220 may be cylindrical or any other shape that permits irradiation targets 250 to enter into and/or pass therethrough. For example, reservoir connector 1220 may have a generally circular cross section with a 0.5-inch diameter and smooth interior surface that permits spherical irradiation target 250 to roll between irradiation target reservoir 1270 and loading junction 1200.

Loading and offloading systems useable in example embodiments permit irradiation targets to be loaded/harvested in a number of direction(s) based on their status and/or destination. Loading and offloading systems are operable during plant operation to properly load, guide, and harvest irradiation targets even when access to areas set off by access barrier 411 and instrumentation tubes 50 is limited. Any number of different sorting and/or directing mechanisms may be used as a loading and offloading system to achieve the desired movement of irradiation targets 250 within example embodiment systems.

The example shown in FIG. 2 includes a loading junction 1200 capable of alternating between two paths: one path between penetration tubing 1100 and reservoir connector 1220; and another path between penetration tubing 1100 and retrieval path 1210. The example shown in FIG. 2 further includes a T-junction 1215 capable of alternating between two paths—one path between retrieval path 1210 and TIP tube 1310, and another path between retrieval path 1210 and harvesting cask 1290. Paths within loading junction 1200 may be configured and fabricated of a material that does not significantly react with or entrain materials from irradiation targets 250 coming into contact therewith.

Loading junction 1200 may be embodied in several different ways. For example, apparatuses 400, 500, and/or 4100 disclosed in co-owned US Patent Publication 2011/0051875, Ser. No. 12/547,249, filed Aug. 25, 2009, incorporated by reference in its entirety, may be used for loading junction 1200 with appropriate configuration of pathways for accommodate irradiation targets 250 and connect with other elements of example embodiment irradiation target delivery and retrieval system 1000. Alternately, known devices for rerouting between pathways may be used for loading junction 1200, including diverters, turntables, sorters, etc.

Figure 3:
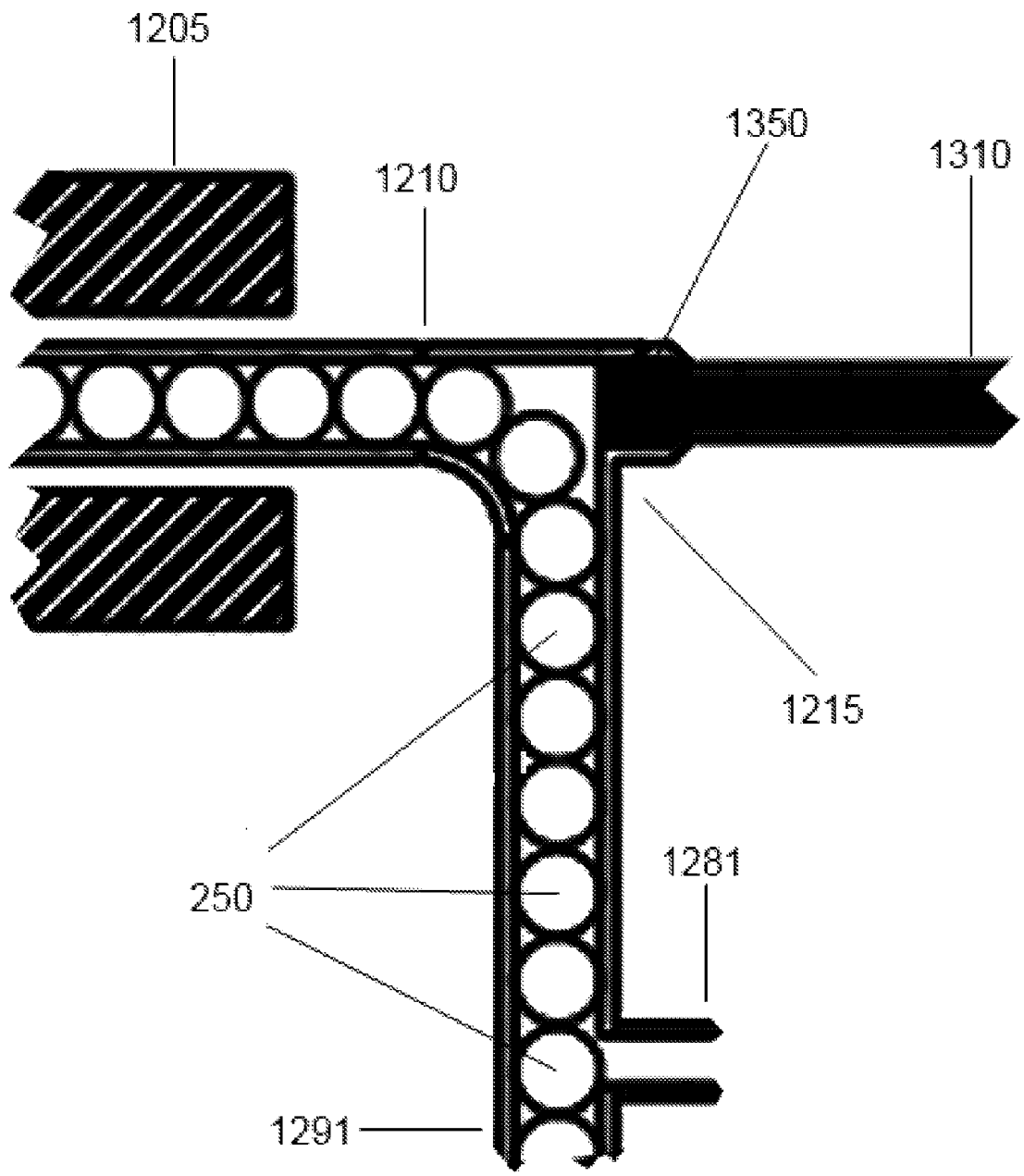
FIG. 3 is a detailed view of a T-junction useable in example embodiment systems.

FIG. 3 is a detailed illustration of T-junction 1215 that may be used in loading and offloading systems. As shown in FIG. 3, retrieval path 1210, TIP tube 1310 and loading cask tube 1291 (or loading cask 1290 directly) may form a T-junction 1215 that permits one or more irradiation targets 250 to move therein, from retrieval path 1210 to cask tube 1291. FIG. 3 illustrates T-junction 1215 during an offloading or harvesting operation where plunger 1350 is withdrawn into TIP tube 1310 and deactivated so as to provide a path between retrieval path 1210 and harvesting cask 1290, such that irradiation targets 250 can move, by gravity, pneumatic force, mechanical action, magnetism, etc., into harvesting cask 1290. During a loading or other operation where access to harvesting cask 1290 is not desired, plunger 1350 may move beyond T-junction 1215 and into retrieval path 1210 so as to prevent any irradiation target 250 from moving into or out of harvesting cask 1290 or cask tube 1291, as shown by a position of plunger 1350 in FIG. 2.

As shown in FIG. 3, a cask exhaust shaft 1281 and/or cask filter 1280 (FIG. 2) may be included on cask tube 1291, on retrieval path 1210, and/or elsewhere in example embodiments to provide an outlet for any pneumatic air used in example embodiments to escape and be filtered of airborne contaminants before exiting example embodiments. Cask exhaust shaft 1281 and/or cask filter 1280 may be configured through sizing or blockages to reduce or prevent irradiation targets 250 and isotopes produced in example systems from escaping from example systems. For example, if pneumatic driving system 500 is used in example embodiments to provide a pneumatic fluid flow and/or pressure to drive irradiation targets 250 and/or desired isotopes produced therefrom into cask 1290, cask exhaust shaft 1281 and/or cask filter 1280 may provide an exit for such air at atmospheric pressure while filtering the same.

If used, retrieval path 1210 and/or cask tube 1291 may be fabricated of a material and of a configuration that does not significantly react with or entrain materials from irradiation targets 250 coming into contact therewith, including, for example, aluminum, stainless steel, nickel alloys, plastics, latex, etc. Retrieval path 1210 and/or cask tube 1291 may be cylindrical or any other shape that permits irradiation targets 250 to enter into and/or pass therethrough. For example, retrieval path 1210 and/or cask tube 1291 may have a generally circular cross section with a 0.5-inch diameter and smooth interior surface that permits spherical irradiation target 250 to roll therein. Oppositely, pathways not required to carry irradiation targets 250, such as cask exhaust shaft 1281 and/or TIPS tube 1310, may have smaller sizes, different cross-section shapes, and/or flow limiters not found in retrieval path 1210 and/or cask tube 1291 to prevent or reduce irradiation target 250 and isotopes produced therefrom from entering those structures.

A plunger shield 1205 may be placed about retrieval path 1210 between 1200 and T-junction 1215. Plunger shield 1205 may be a radiation shielding structure that limits radiation exposure that may originate from plunger 1350 and cable 1305 in retrieval path 1210. For example, plunger shield may be any a solid material of a thickness and size placed around retrieval path 1210 to sufficiently block ionizing radiation. If plunger 1350 becomes radioactive, it may be stored in example embodiments inside of plunger shield 1205 to reduce worker exposure.

As shown in FIG. 2, harvesting cask 1290 may be any storage receptacle capable of containing irradiated targets 250, including solid, liquid, and gaseous isotope products formed from irradiation targets 250 through irradiation. For example, harvesting cask 1290 may be a radiation-hardened shipping cask that complies with relevant radioactive shipping regulations. If harvesting cask 1290 is accessible outside of access barrier 411 at any time during operation of a nuclear power plant, it may be possible to relatively quickly harvest produced isotopes from example embodiments. Harvesting cask 1290, although shown as connected to a single example embodiment irradiation target delivery and retrieval system 1000 in FIG. 2, may be connected to multiple systems so as to provide a shared harvesting cask 1290 for multiple systems irradiating irradiation targets 250 across many instrumentation tubes 50. For example, multiple T-junctions 1215 may connect to an individual harvesting cask 1290 where all irradiation targets from multiple example embodiments may be stored and harvested. Of course, individual harvesting casks 1290 may be used for individual example embodiment irradiation target delivery and retrieval systems, to segregate irradiation targets 250 by individual system and/or instrumentation tube 50.

In FIG. 2, harvesting cask 1290 and/or cask tube 1291 is shown equipped with a target counter 1295 that counts or measures properties of irradiation targets 250 moving into harvesting cask 1290. For example, target counter 1295 may count a number of discreet irradiated targets 250 that pass into harvesting cask 1290, using an optical or magnetic counter capable of counting each irradiated target 250. Similarly, target counter 1295 may detect and/or measure properties of irradiation targets 250 such as radioactivity, mass, temperature, flow rate, etc., that may be used to determine a number of irradiation targets 250, an amount of produced radioisotope, or any other property of irradiated targets 250. For example, target counter 1295 may be used to determine when all irradiated irradiation targets 250 and/or all expected produced isotope material has entered harvesting cask 1290 to indicate completion of a harvesting operation and readiness of harvesting cask 1290 to be removed to delivered to processing or end users.

Figure 4:
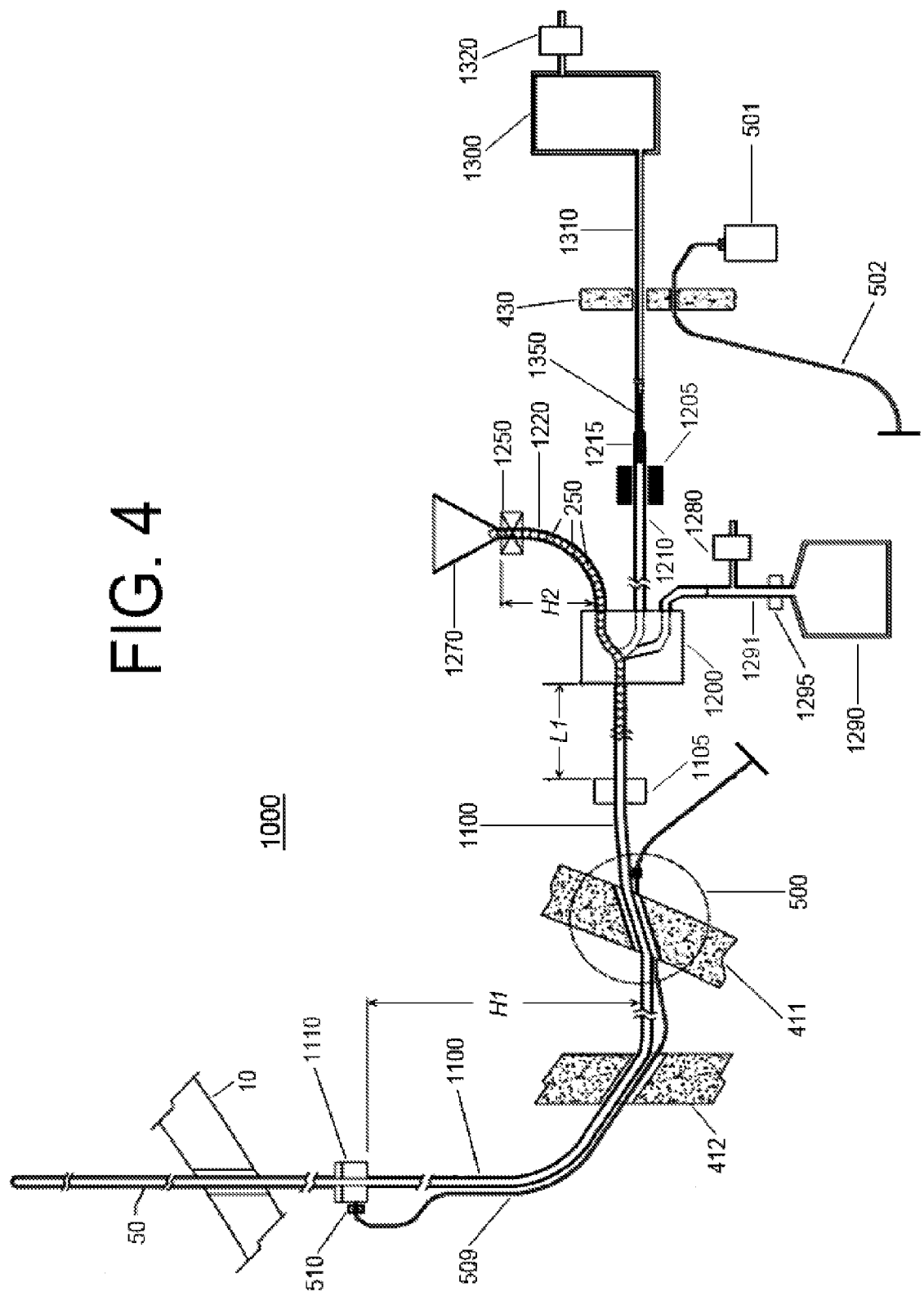
FIG. 4 is an illustration of another example embodiment irradiation target retrieval system in a loading configuration.

Although loading and offloading systems shown in the example of FIG. 2 include a loading junction 1200 and a T-junction 1215 to discriminate among multiple entry and offloading paths for irradiation targets 250 moving therethrough, it is understood that different apparatuses and paths may be used in example embodiments, depending on multiplicity of loading, offloading, and penetration points. For example, as shown in FIG. 4, loading junction 1200 may be capable of creating three or more paths into/out from penetration tubing 1100 to create discrete paths between penetration tubing and target reservoir 1270, TIP tube 1310, and harvesting cask 1290. Such a device includes device 500 from the incorporated 2011/0051875 document. Although FIG. 4 is shown in a loading configuration where irradiation targets 250 move from target reservoir 1270 through loading junction 1200 into penetration tubing 1100 for loading and irradiation into associated instrumentation tube 50, it is understood that loading junction is capable of separately or simultaneously providing a path for plunger 1350 to extend from retrieval path 1210 through loading junction 1200 into penetration tubing 1100 and a path from penetration tubing 1100 through loading junction 1200 into harvesting cask 1290. Still further, loading and offloading systems may include multiple T-junctions 1215 (shown singly in FIG. 2) arranged in series, or multiple guides (element 4100 from the incorporated 2011/0051875 document) arranged in series, to successively create additional paths that can be accessed or blocked as desired to create a desired origin and destination through example systems in nuclear power plants.

Example embodiments may include drive systems or be operable with existing drive systems that move irradiation targets 250 from an origin, into an instrumentation tube 50, and to an accessible harvesting point following irradiation in example embodiment irradiation target delivery and retrieval systems. As shown in FIG. 2, at various points gravity may drive irradiation targets 250 between desired points in example systems. Similarly, pneumatic forces, such as those caused by induced pressure differentials within example systems, may move irradiation targets 250 within example systems. Systems providing magnetic or mechanical forces may similarly be used in example embodiments to move irradiation targets 250 therein. Additionally, a TIP drive 1300 may be used in example embodiments to move irradiation targets 250 in example system 1000.

As shown in FIG. 2, a TIP drive 1300 may be used to supplement movement of irradiation targets 250 through example system 1000. TIP drive 1300 may be existing at some nuclear reactor plants or newly installed. For example, TIP drive 1300 may be drive system 300 from the incorporated 2011/0051875 document or another driving device. TIP drive 1300 may be communicatively connected to a control room or automatically or manually operable to drive irradiation targets 250 to known positions within example systems based on operation of TIP drive 1300. As shown in FIG. 2, TIP drive 1300 may include TIP tube 1310 that may connect TIP drive 1300 to loading/offloading systems in example embodiments where TIP drive 1300 may mechanically move irradiation targets through example systems. TIP Tube 1310 may be configured to pass through a TIP room wall 430 and any other structures to connect with example systems. As with other tubing useable in example embodiments, TIP drive 1300 may include a TIP filter 1320 that permits gas exhaust and/or pneumatic air flow out from example embodiment systems following a filtering to remove contaminants.

Figure 5:
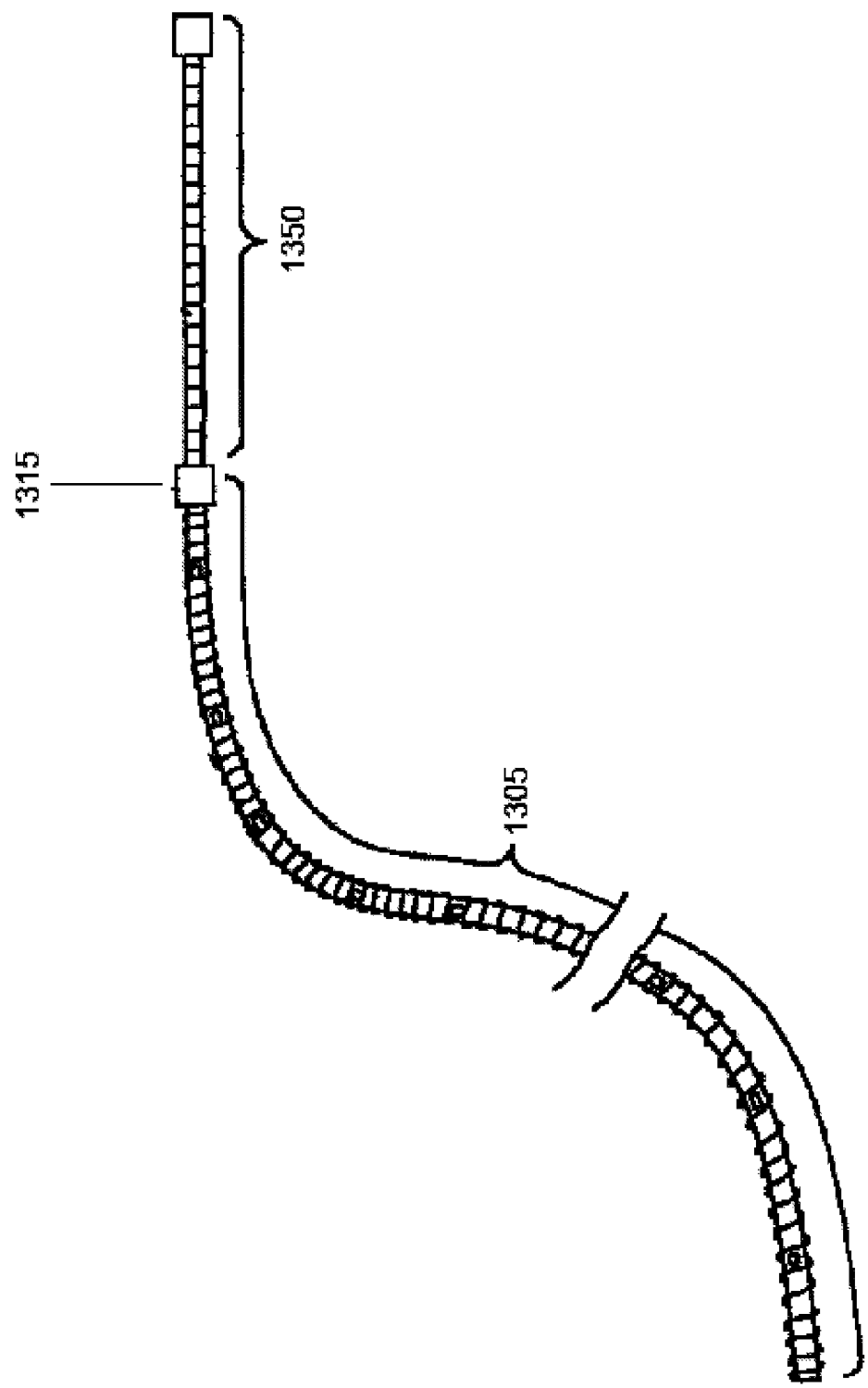
FIG. 5 is a detail view of a TIP cable modified with a plunger useable in example embodiment systems.

As shown in FIG. 5, TIP drive 1300 may drive a helical TIP cable 1305. For example, TIP cable 1305 may resemble a rope having a relatively long driving portion. TIP cable 1305 may be made from a material having a low nuclear cross-section such as aluminum, silicon, stainless steel, etc. and may be braided in order to increase flexibility, stiffness and/or strength so that TIP cable 1305 may be easily bendable and capable of snaking through penetration pathways and loading/offloading systems of example embodiments. Although TIP cable 1305 may be flexible, it also has sufficient axial rigidity to transmit a driving mechanical force without buckling. TIP cable 1305 may further have a diameter and other physical characteristics configured to fit and move within any tubing or other transit portions of example embodiments and instrumentation tube 50. TIP cable 1305 may include a helical winding configured to cooperate with a helical gear that may be present in TIP drive 1300.

As shown in FIG. 5, plunger 1350 may be connected to TIP cable 1305 at a connection point 1315. For example, an existing TIP cable 1305 may be modified by removing instrumentation or another feature on its end and attaching plunger 1350. Plunger 1350 may be relatively rigid and include a head portion capable of bearing or pushing irradiation targets 250 through example systems. Plunger 1350 may be fabricated of a material that substantially maintains its physical characteristics within an operating nuclear reactor environment while not substantially reacting with or entraining any irradiation target 250 or isotope produced therefrom. For example, plunger 1350 may be fabricated of a steel or aluminum alloy, high-temperature ceramic, etc. Plunger 1350 may further be formed of a ferromagnetic material or sensor such that its position may be tracked with appropriate detectors in example embodiments, such as sensors in plunger shield 1205, flow limiter 1105, etc. Plunger 1350 may further be shaped and sized to fit nearly flush with TIP tube 1310 so as to prevent or reduce any irradiation target 250 or isotope product movement into TIP tube 1310 past loading/offloading systems.

Example drive systems may be pre-existing and configured and/or newly installed and useable with example embodiment irradiation target delivery and retrieval system 1000. For example, an existing TIP system may be removed past TIP tube 1310 and connected to example system as shown in FIG. 2 installed in a nuclear facility, or a driver system may be newly installed and connected to example embodiment irradiation target delivery and retrieval system. If example systems are connected by tubing or other enclosed transit paths, a pneumatic driving system 500 and/or other pneumatic force devices may be used to drive irradiation targets 250 therein while filtering all pneumatic exhaust through HEPA-type filters at exhaust points so as to reduce or prevent escape of produced isotope contaminants. It is further understood that a drive system useable with example embodiments may be entirely passive or gravity-driven, by appropriately choosing height H2 and relative positioning of irradiation target 250 origins and harvesting terminals.

Irradiation targets 250 are capable of movement, including rolling, conveyance, flow, etc., within example embodiment irradiation target delivery and retrieval systems and, as such, may take on many physical forms. Irradiation targets 250 further substantially convert to a desired isotope after being exposed to neutron and/or other radiation within reactor vessel 10 and/or core 15.

Figure 6A:
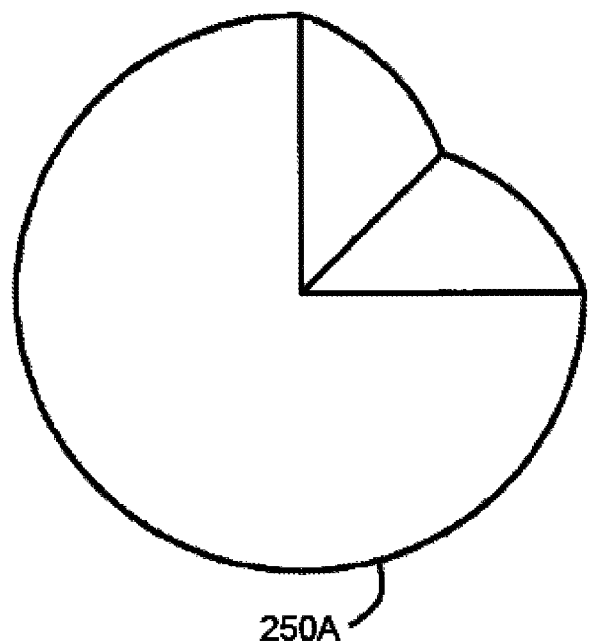
FIGS. 6a and 6b are illustrations of example embodiment irradiation targets with cross-sectioning showing target interiors.
Figure 6B:
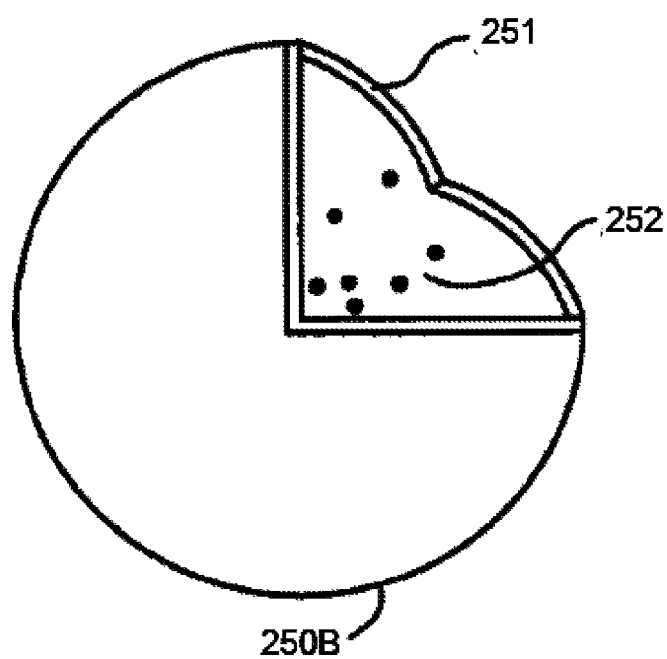

FIGS. 6A and 6B are illustrations of example embodiment irradiation targets 250a and 250b in generally spherical form. As shown in FIG. 6A, irradiation target 250a may be a solid sphere of material that readily converts to desired isotopes after hours or days of exposure to radiation generated within nuclear core 15. Alternatively, as shown in FIG. 6B, irradiation target 250b may include a containment shell 251 that houses a solid, liquid, or gaseous material 252 that converts to desired isotopes which are equally contained by containment shell 251 after hours or days of exposure to radiation from nuclear core 15. One potential advantage of using example embodiment irradiation targets 250a and 250b is that the spherical surface may be polished and made even so as to readily roll within tubing useable in example embodiments, reducing friction and risk of snagging, damage, or abrading to irradiation targets 250. Of course, other shapes and configurations of irradiation targets 250 are useable in example embodiments to match other types of penetration pathways, instrumentation tube configurations, and loading/offloading systems.

The materials used in irradiation targets 250 may be selected from any material having an absorption cross-section for radiation encountered in instrumentation tube 50 that will permit the material to appreciably convert to a desired daughter product. For example, cobalt-59, iridium-191, iridium-193, tungsten-185, tungsten-187, etc. may be converted to valuable precious metals. Similarly, molybdenum-98, dysprosium-164, holmium-165, lutetium-176, potassium-41, sodium-23, and ytterbium-168 may be converted into valuable radioisotopes useable in various known medical imaging, scanning, diagnostic, and therapeutic treatments. One particular advantage possible with example embodiments and methods is that these latter radioisotopes, each having shorter half-lives on the scale of hours or days, may be readily generated and harvestable without delays due to inaccessibility of access restricted areas proximate to instrumentation tube openings in nuclear power plants.

As a specific example, irradiation targets 250 may be fabricated as spheres of molybdenum-98 or naturally occurring molybdenum, converted to molybdenum-99 through a few hundred hours of irradiation with thermal neutron flux in an operating nuclear reactor, and immediately deposited in a harvesting cask where the molybdenum-99, with a half-life of 66 hours, will decay with a half-life of 66 hours into technetium-99 with a half-life of 6 hours. The harvesting cask may be transported to medical facilities potentially around the world while the molybdenum-99 is decaying, presenting the medical facilities with a ready source of technetium-99.

Irradiation targets 250 may further include a tracking target located at a known position among all other targets that is fabricated of a material that is different from all other targets and permits tracking or locating of irradiation targets 250. For example, the first and last irradiation target 250 may be fabricated of a ferromagnetic material that can be tracked with a magnet sensor, or may be fabricated of a material converting to a different isotope product that can be detected with a radiation sensor. Or, for example, irradiation targets 250 may be fabricated of a material and mass corresponding to an amount of radiation expected to be encountered at a known axial level of the irradiation target 250. By varying the detectable physical properties of irradiation targets 250, it may be possible to ensure that all targets have moved properly through example systems and/or that an optimal amount of desired isotope produce is produced from irradiation targets 205.

Example Methods

Example embodiment irradiation target delivery and retrieval systems are useable with example methods to load, irradiate, and harvest irradiation targets in a continuous and timely fashion within an otherwise potentially inaccessible nuclear reactor. FIG. 8 is a flow chart of an example method that may be carried out with example embodiments.

As shown in FIG. 8, one or more irradiation targets may be supplied to an irradiation target delivery and retrieval system within a nuclear power plant in S100. Supplying may include a periodic or continuous supplying to a cache of targets or supplying only an amount for immediate use in example methods. Different types and numbers of irradiation targets may be supplied in S100, and supplying may be achieved during commercial operation of the nuclear power plant. For example, using the example system of FIG. 2, a number of irradiation targets 250 required to fill a number of instrumentation tubes 50 may be supplied to a shared irradiation target reservoir 1270 or to multiple target reservoirs 1270 for each instrumentation tube and associated system.

In S200, a penetration pathway is created by loading/offloading systems to permit irradiation targets to move from the supply point of S100 into an access-restricted area and one or more instrumentation tubes for irradiation. For example, as shown in FIG. 2, loading junction 1200 may create a pathway for irradiation targets 250 to pass from reservoir 1270 into penetration tubing 1100 by rotating or otherwise sealing off other paths. Reservoir flow limiter 1250 releases a desired number of irradiation targets 250 into a desired loading junction 1200 (among several potential junction points if a shared reservoir is used) and penetration tubing 1100. As discussed above, several different path creation mechanisms may be utilized in S200, including advancing plunger 1350 to a T-junction (not shown) between retrieval path 1210, penetration tubing 1100, and irradiation target reservoir 1270 to create a single path for irradiation targets 250 into penetration tubing 1100. Irradiation targets 250 may move by gravitational, pneumatic, magnetic, mechanical, etc. forces into penetration pathways in S200.

In S250, irradiation targets may be held outside an access barrier while loading/offloading systems seal off reservoirs, create different flow paths, and/or permit a driving system to access irradiation targets. For example, as shown in FIG. 2, irradiation targets 250 may be stopped by pathway flow limiter 1105 and back up to loading junction 1200 a distance of L1, and loading junction 1200 may create a different path such that plunger 1350 and TIP cable 1305 can extend out of TIP tube 1310, through retrieval path 1210 and loading junction 1200 to bias against a final irradiation target 250 in penetration tubing 1100. It is understood that, like any step, S250, may be omitted, particularly in the instance of a purely gravitational-driven system.

In S300, irradiation targets move through penetration pathways into an access-restricted area such as drywell 20 and a corresponding instrumentation tube. As shown in FIG. 2, irradiation targets 250 may move through penetration tubing 1100 through access barrier 411 and around or through any structures therein, such as pedestal 412, to flange 1110 and into instrumentation tube 50 spatially inside reactor vessel 10.

Figure 7:
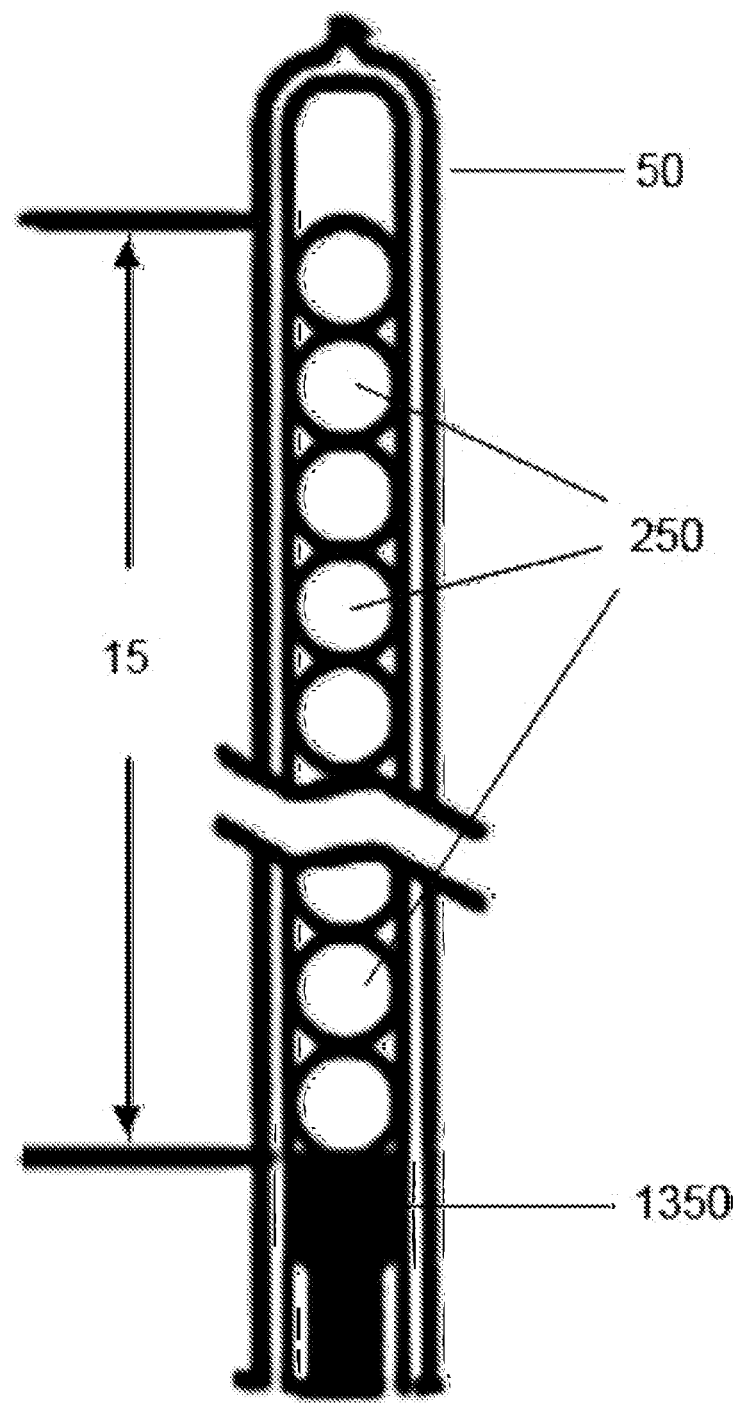
FIG. 7 is a detail view of an instrumentation tube filled with irradiation targets by example systems and methods.

In S400, irradiation targets are held within an instrumentation tube at desired positions and for a desired amount of time to generate daughter isotopes from exposure to radiation within instrumentation tubes. As shown in FIG. 7, irradiation targets 250 may extend axially in instrumentation tube 50 a length of core 15 (approximately 12 feet for a some conventional BWR cores), absorbing neutron flux from core 15 and converting into desired isotopes. In the example of FIG. 7, irradiation targets 250 are maintained by plunger 1350 extending all through penetration tubing 1100 and maintained at flange 1110 to hold irradiation targets 250 at axial positions within instrumentation tube 50 until irradiation is complete. It is understood that other holding mechanisms, including valves, latches, gravity form counterbalancing, etc. may equally maintain irradiation targets in S400.

In S500, irradiation targets are removed from the instrumentation tube after residence in the reactor for a predetermined time for producing a desired amount of harvestable isotope. For example, plunger 1350 and TIP cable 1305 may be withdrawn out through access barrier 411 and irradiated irradiation targets 250 may descend by gravity or any other force out of instrumentation tube 50.

In S550 additional driving forces may be used to move irradiation targets back out of penetration pathways. For example, pneumatic driving system 500 may force irradiation targets 250 out of an area restricted by access barrier 411 through a pressure differential formed from injected air. Of course, other mechanical, magnetic, electrical, etc. forces may be used to drive irradiation targets 250 through penetration tubing 1100 outside of access barrier 411.

In S600, at some point following insertion of irradiation targets in S300, loading/offloading systems are reconfigured to provide an exit pathway for irradiation targets to be harvested following irradiation. For example, as shown in FIG. 4, plunger 1350 may be withdrawn through loading junction 1200 to T-junction 1215 to form a pathway into harvesting cask 1290. Alternatively, in an example system as shown in FIG. 4, loading junction 1200 may rotate to or otherwise create a unique path into harvesting cask 1290 for irradiated targets 250, following withdrawal of plunger 1350. Of course, multiple T-junctions and other combinations of forks, dividers, turntables, sorters, etc., may be used to create the unique loading and harvesting paths in loading/offloading systems usable with example methods and embodiments.

In S700, the irradiated irradiation targets containing desired isotopes produced therein are moved through delivery and retrieval systems to an accessible exit for shipping or consumption, regardless of plant state. For example, as shown in FIG. 3, irradiation targets 250 may be directed into harvesting cask 1290 by gravity and/or pneumatic forces. Harvesting cask 1290 may then be used as shipping cask or emptied into a replacement shipping cask and shipped directly to end users. A single or multiple exits may be used in S700, with irradiation targets from several example systems and instrumentation tubes being emptied into a single harvesting point or individual, separate points.

Example methods may be executed continuously and automatically without significant user interaction, based on product need, plant conditions, and/or irradiation target supply. For example, various sensors, flow limiters, and drives of example system 1000 may be used to coordinate movement of irradiation targets 250 through example system 1000. Irradiation targets 250 may be supplied in type and amount to particular systems and instrumentation tubes 50 from single or multiple target reservoirs 1270, and their harvesting into one or more harvesting casks 1290 may be equally coordinated to ensure a desired number and type, including activity and daughter product identity, are present in specific harvesting casks 1290. Further, users or plant operators may be able to remotely track or control operations of example systems through communicative connections with the various sensors, flow limiters, and drives of example system 1000.

It is understood that creation of pathways from various points in example systems and example methods may include the installation of tubing or other pathways and pathway selection systems including loading/offloading systems within access-restricted areas and nuclear plant facilities when accessible, such as during a plant outage. For example, penetration tubing 1100, reservoir tubing 1220, and/or retrieval path 1210 may all be installed as parts of example methods.

Example embodiments and methods thus being described, it will be appreciated by one skilled in the art that example embodiments may be varied and substituted through routine experimentation while still falling within the scope of the following claims. For example, the types and numbers of penetration pathways, loading/offloading systems, and drive systems falling within the claims are not limited to the specific systems shown and described in the figures—other specific devices and systems for loading irradiation targets into an access-restricted area of a nuclear power station and instrumentation tube for irradiation and offloading the same outside the access-restricted area for harvesting are equally useable as example embodiments and fall within the scope of the claims. Such variations are not to be regarded as departure from the scope of the following claims.

What is claimed is:

1. A system for delivering and retrieving irradiation targets through a nuclear reactor, the system comprising:
    a penetration pathway connecting an origin point outside an access barrier of the nuclear reactor and an instrumentation tube extending into the nuclear reactor inside the access barrier, wherein the access barrier encloses a space around the nuclear reactor and prevents direct human access to the instrumentation tube; and
    a loading/offloading system including a first pathway, a second pathway, and a third pathway,
    wherein, the first pathway connects an irradiation target source and the origin point, the second pathway connects the origin point and an irradiation target harvesting point outside the access barrier, the first and the second pathways join only at the origin point, the loading/offloading system is configured to provide one of the first and the second pathways based on a destination of the at least one irradiation target, the penetration, first, and second pathways each include a surface on which the irradiation targets directly move between connected points and an open space adjacent to the surface and between connected points sized to fit the irradiation targets, and the third pathway includes a surface and an open space adjacent to the surface that connects a drive system and the origin point, wherein the drive system includes a plunger and a cable shaped to pass through the penetration pathway and drive at least one irradiation target into the instrumentation tube.

2. The system of claim 1, wherein,
    the penetration pathway includes tubing extending from the origin point, through a penetration in the access barrier, and to the instrumentation tube, and
    the open space of the penetration pathway is isolated from the enclosed space bounded by the access barrier.

3. The system of claim 1, wherein the plunger and the cable are attached to a TIP drive.

4. The system of claim 1, wherein the drive system includes a pneumatic air system configured to drive the at least one irradiation target in the penetration pathway by a pressure differential.

5. The system of claim 1, wherein,
    the open spaces in the first, second, third, and penetration pathway are enclosed by the surfaces except for exhaust points outside of the access barrier, and
    the exhaust points include a HEPA-grade filter to prevent airborne materials from escaping the system.

6. The system of claim 1, wherein the loading/offloading system includes at least one of a loading junction and a T-junction that are configured to cause the irradiation targets to traverse only one of the first and the second pathways at any time.

7. The system of claim 1, further comprising:
    the irradiation target source including an irradiation target reservoir connected to the loading/offloading system; and
    a flow restrictor between the irradiation target reservoir and the loading/offloading system.

8. The system of claim 7, wherein the penetration, the first, and the second pathways connect only at the origin point, and wherein the system is entirely below the instrumentation tube.

9. The system of claim 1, wherein,
the harvesting point includes a harvesting cask connected to the loading/offloading system, and
the harvesting cask is configured to contain irradiated irradiation targets for shipping without leakage.

10. The system of claim 1, further comprising:
at least one irradiation target moveable within the system; and
a drive system connected to the penetration pathway and the loading/offloading system, wherein the drive system is configured to move the at least one irradiation target within the system.

11. The system of claim 10, wherein,
the at least one irradiation target are a plurality of irradiation targets, and
the plurality of irradiation targets are spherical.

12. The system of claim 11, wherein,
the penetration pathway and loading/offloading system include tubing connecting the origin point and the instrumentation tube and connecting the instrumentation tube and the harvesting point, and
the tubing is sized to permit the plurality of irradiation targets to roll in the tubing from any of the origin point, instrumentation tube, and harvesting point.

13. The system of claim 12, wherein the plunger and cable are configured to maintain the plurality of irradiation targets at a desired axial location within the instrumentation tube.

14. The system of claim 10, wherein the irradiation target is a molybdenum-98 sphere.

15. The system of claim 1, wherein the access barrier is a containment building surrounding the nuclear reactor, and wherein the space includes a drywell below the nuclear reactor into which the instrumentation tubes open.

16. The system of claim 15, wherein the access barrier further includes an annular reactor pedestal within the containment building.

17. The system of claim 1, wherein the loading/offloading system is configured to cause the irradiation targets to traverse only one of the first and the second pathways at any time.

18. The system of claim 1, further comprising:
a drive system outside the access barrier.

* * * * *